US012734791B2

(12) United States Patent
Gomer et al.

(10) Patent No.: US 12,734,791 B2
(45) Date of Patent: Sep. 15, 2026

(54) LAMINATED PANE FOR A HEAD-UP DISPLAY

(71) Applicant: SAINT-GOBAIN GLASS FRANCE, Courbevoie (FR)

(72) Inventors: Andreas Gomer, Herzogenrath (DE); Valentin Schulz, Herzogenrath (DE); Martin Arndt, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 293 days.

(21) Appl. No.: 18/293,164

(22) PCT Filed: Aug. 30, 2022

(86) PCT No.: PCT/EP2022/074048

§ 371 (c)(1),
(2) Date: Jan. 29, 2024

(87) PCT Pub. No.: WO2023/031176

PCT Pub. Date: Mar. 9, 2023

(65) Prior Publication Data

US 2024/0253331 A1 Aug. 1, 2024

(30) Foreign Application Priority Data

Sep. 3, 2021 (EP) .................................... 21194855

(51) Int. Cl.
*B32B 17/10* (2006.01)
*G02B 27/00* (2006.01)
*G02B 27/01* (2006.01)

(52) U.S. Cl.
CPC .. *B32B 17/10458* (2013.01); *B32B 17/10036* (2013.01); *B32B 17/10568* (2013.01);
(Continued)

(58) Field of Classification Search
None
See application file for complete search history.

(56) References Cited

U.S. PATENT DOCUMENTS 5,882,774 A 3/1999 Jonza et al.
5,999,314 A * 12/1999 Asakura ............ B32B 17/10761 359/485.02

(Continued)

FOREIGN PATENT DOCUMENTS

CN CN 111417516 A 7/2020
CN CN 111433023 A 7/2020

(Continued)

OTHER PUBLICATIONS

International Search Report as issued in International Patent Application No. PCT/EP2022/074048, dated Oct. 19, 2022.

(Continued)

*Primary Examiner* — Ryan Crockett
(74) *Attorney, Agent, or Firm* — CUSHMAN PARTNERS, LLC

(57) ABSTRACT

A laminated pane for a head-up display (HUD) having an upper edge, a lower edge and an HUD region includes an outer pane, a first thermoplastic intermediate layer, a functional film which is suitable for reflecting at least 5% of p-polarized radiation striking the functional film, a second thermoplastic intermediate layer, the thickness of which is variable in the vertical course at least in the HUD region, and an inner pane. The functional film is arranged between the outer pane and the inner pane, the first thermoplastic intermediate layer is arranged between the outer pane and the functional film, the second thermoplastic intermediate layer is arranged between the functional film and the inner pane, and the second thermoplastic intermediate layer has a maximum wedge angle (α) of less than 0.20 mrad.

21 Claims, 2 Drawing Sheets

(52) U.S. Cl.
CPC .. *B32B 17/10761* (2013.01); *B32B 17/10779* (2013.01); *B32B 17/10935* (2013.01); *G02B 27/0018* (2013.01); *G02B 27/0101* (2013.01); *B32B 2255/10* (2013.01); *B32B 2255/26* (2013.01); *B32B 2307/7376* (2023.05); *B32B 2605/00* (2013.01)

(56) References Cited

U.S. PATENT DOCUMENTS

2002/0094407 A1* 7/2002 Frost ................. B32B 17/10036
428/77
2004/0135742 A1 7/2004 Weber et al.
2019/0064516 A1* 2/2019 Wagner .............. G02B 27/0101
2023/0204955 A1* 6/2023 Tso ................... B32B 17/10091
359/630
2024/0083144 A1* 3/2024 Hagemann ........ B32B 17/10357
2024/0217215 A1* 7/2024 Palmantier .............. B32B 23/20

FOREIGN PATENT DOCUMENTS

CN 113031276 A 6/2021
CN 113071165 A 7/2021
DE 10 2014 220189 A1 4/2016
DE DE 20 2020 107202 U1 2/2021
WO WO 2019/046157 A1 3/2019
WO WO 2019/179783 A1 9/2019
WO DR WO 2021/145387 A1 7/2021

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.tum.de/1079689?id=1079689&change_language=en>. (English abstract on p. 5 of document).

First Office Action as issued in Chinese Patent Application No. 202280004389.X, dated Nov. 6, 2025.

* cited by examiner

LAMINATED PANE FOR A HEAD-UP DISPLAY

CROSS-REFERENCE TO RELATED APPLICATIONS

This application is the U.S. National Stage of PCT/EP2022/074048, filed Aug. 30, 2022, which in turn claims priority to European patent application number 21194855.9 filed Sep. 3, 2021. The content of these applications are incorporated herein by reference in their entireties.

The invention relates to a laminated pane for a head-up display, a method for its production, and its use.

Laminated panes are currently used in many places, in particular in vehicle construction. The term “vehicle” comprises, among other things, road vehicles, aircraft, ships, agricultural machines or also tools.

Laminated panes are also used in other areas. These include, for example, building glazings or information displays, e.g., in museums or as advertising displays.

A laminated pane generally has two panes which are laminated onto an intermediate layer.

In particular, windshields are increasingly equipped with so-called head-up displays (HUDs). With a projector, typically in the area of the dashboard, images are projected onto the windshield, reflected there, and perceived by the driver as a virtual image behind the windshield (as seen by the driver). Thus, important information can be projected into the field of vision of the driver, for example, the current travel speed, navigation messages or warnings that the driver can perceive without having to turn his gaze away from the road. Head-up displays can accordingly contribute substantially to increasing traffic safety.

DE 10 2014 220 189 A1 discloses an HUD projection arrangement which is operated with p-polarized radiation to generate an HUD image. Since the incidence angle is typically close to the Brewster angle, and p-polarized radiation is therefore reflected only to a small degree by the glass surfaces, the windshield has a reflective structure which can reflect p-polarized radiation toward the driver. Proposed as a reflective structure is a single metallic layer having a thickness of 5 nm to 9 nm, e.g., made of silver or aluminum, which is applied to the outer side of the inner pane facing away from the interior of the passenger vehicle.

US 2004/0135742 A1 also discloses a HUD projection arrangement which is operated with p-polarized radiation to produce a HUD image and has a reflective structure which can reflect p-polarized radiation towards the driver. The multilayer polymer layers disclosed in U.S. Pat. No. 5,882,774 A are proposed as a reflective structure.

CN 113031276 A discloses a HUD projection arrangement operated with p-polarized radiation with a layer reflecting p-polarized radiation on the interior-side surface of the inner pane of a laminated pane.

WO 2019/179783 A1 discloses a projection arrangement for a head-up display, at least comprising a laminated pane, comprising an outer pane and an inner pane which are connected to one another via a thermoplastic intermediate layer, with an upper edge and a lower edge and an HUD region; an electrically conductive coating on the surface of the outer pane or of the inner pane facing the intermediate layer or within the intermediate layer; and a projector which is directed toward the HUD region, wherein the radiation of the projector has at least one p-polarized section, wherein the electrically conductive coating has only a single local reflection maximum for p-polarized radiation in the spectral range from 400 nm to 650 nm which is within a range from 510 nm to 550 nm.

WO 2019/046157 A1 discloses an HUD projection arrangement which is operated with p-polarized radiation in order to produce an HUD image which has an outer pane, a wedge-shaped intermediate layer and an inner pane, wherein a coating reflecting p-polarized radiation is applied on the outer surface of the inner pane.

CN 113071165 A discloses an HUD projection arrangement which is operated with p-polarized radiation in order to produce an HUD image which has an outer pane, a wedge-shaped intermediate layer and an inner pane, wherein a coating reflecting p-polarized radiation is applied on the interior-side surface of the outer pane, and a reflection-increasing coating is applied on the interior-side surface of the inner pane.

Since projectors in an HUD projection arrangement which is operated with p-polarized radiation in order to generate an HUD image generally do not emit the p-polarized radiation in a single beam, but rather as a ray bundle of countless rays which strike the laminated pane at different angles, the entire radiation emitted by the projector does not strike the interior-side surface of the inner pane of the laminated pane at a Brewster angle. This results in a second image of low intensity due to reflections at the interior-side surface of the inner pane of the laminated pane and a first image of high intensity due to the reflection on the layer reflecting p-polarized radiation. For the viewer, both images are visible shifted relative to one another, similar to the occurrence of classical ghost images. However, with classic ghost images, the reflection at the interior-side surface of the inner pane of the laminated pane is of greater intensity than the reflection within the laminated pane.

The object of the present invention is to provide an improved laminated pane and an improved projection arrangement for a head-up display. Another object of the invention is to specify a production method.

The object of the present invention is achieved according to the invention by a laminated pane, a production arrangement, and a method according to the independent claims. Preferred embodiments are apparent from the dependent claims.

The laminated pane according to the invention comprises an outer pane, a first thermoplastic intermediate layer, a functional film, a second thermoplastic intermediate layer, and an inner pane. The functional film is arranged between the outer pane and the inner pane. The first thermoplastic intermediate layer is arranged between the outer pane and the functional film, and the second thermoplastic intermediate layer is arranged between the functional film and the inner pane.

The laminated pane according to the invention has an upper edge and a lower edge and two side edges. “Upper edge” means the edge of the laminated pane which is intended to point upward in the installed position.

Lower edge means the edge intended to point downward in the installed position. If the laminated pane is the windshield of a motor vehicle, the upper edge is often also referred to as the roof edge, and the lower edge is often also referred to as the engine edge.

The outer pane, the inner pane, the first thermoplastic intermediate layer, the second thermoplastic intermediate layer and the functional film each have an outer-side and an interior-side surface, an upper edge, a lower edge and two side edges. “Upper edge” means the edge intended to point upward in the installed position. Lower edge means the edge intended to point downward in the installed position. In the context of the invention, the outer surface means the main surface which is provided to face the external environment when installed. In the context of the invention, the interior-side surface means the main surface which is intended to face the interior space when installed. The interior-side surface of the outer pane and the outer-side surface of the inner pane face one another and are connected to one another by the thermoplastic intermediate layer and the second thermoplastic intermediate layer.

The outer-side surface of the outer pane is designated as side I. The interior-side surface of the outer pane is designated as side II. The outer-side surface of the inner pane is designated as side III. The interior-side surface of the inner pane is designated as side IV.

According to the invention, the functional film is a reflective film which can be used as an HUD film and is suitable for reflecting at least 5%, preferably 10% to 70%, particularly preferably 15% to 60%, in particular 20% to 50%, of p-type polarized radiation striking the film.

The functional film is particularly suitable for reflecting at least 5%, preferably 10% to 70%, particularly preferably 15% to 60%, in particular 20% to 50%, of p-polarized radiation striking the film at an angle of incidence of 55° to 80°, preferably 55° to 75°, and particularly preferably 60° to 70°.

Since the functional film, as described above, is a reflective film which can be used as an HUD film, it is understood that the p-polarized radiation which the functional film is suitable for reflecting is p-polarized radiation in the visible spectral range, i.e., in the range from 400 nm to 780 nm.

According to the invention, the thickness of the second thermoplastic intermediate layer is at least sectionally variable. According to the invention, the maximum wedge angle $\alpha$ (alpha) of the second thermoplastic intermediate layer is less than 0.20 mrad. However, the wedge angle has, at least sectionally, a finite wedge angle, i.e., a wedge angle greater than 0°. Here, "sectionally" means that the vertical course between the lower edge and the upper edge has at least one section in which the thickness of the second thermoplastic intermediate layer changes depending on the location. However, the thickness can also change in several sections or throughout the vertical course. A vertical course means the course between the bottom edge and the top edge with the direction of the course basically perpendicular to said edges.

A "wedge angle" is the angle between the two surfaces of the second thermoplastic intermediate layer. If the wedge angle is not constant, the tangents to the surfaces are to be used for its measurement at one point.

The inner pane and the outer pane have, independently of one another, a substantially constant thickness. Consequently, they have a substantially rectangular cross-section. The inner pane and the outer pane are therefore not wedge glass panes.

The first thermoplastic intermediate layer has a substantially constant thickness. Consequently, it has a substantially rectangular cross-section. Accordingly, the first thermoplastic intermediate layer is not a wedge film.

Since the second thermoplastic intermediate layer has a maximum wedge angle and the outer pane, the first thermoplastic intermediate layer and the inner pane are of substantially constant thickness, the laminated pane according to the invention also has a maximum wedge angle. It is understood that the maximum wedge angle of the laminated pane according to the invention corresponds to the maximum wedge angle of the second thermoplastic intermediate layer.

In the present application, a substantially constant thickness of a pane or a layer is to be understood to mean that the thickness of the pane or the layer is constant over the length and width within the scope of normal manufacturing tolerances. This preferably means that the thickness varies by no more than 5%, preferably by no more than 3%.

In a preferred embodiment, the second thermoplastic intermediate layer has a maximum wedge angle $\alpha$ between 0.01 mrad and 0.19 mrad, particularly preferably between 0.12 mrad and 0.15 mrad, for example 0.12, mrad, 0.14 mrad or 0.15 mrad. The maximum wedge angle means the largest wedge angle which occurs in the intermediate layer.

The wedge angle of the second thermoplastic intermediate layer can have a constant vertical curve, which leads to a linear change in thickness of the second thermoplastic intermediate layer, wherein the thickness is typically greater from bottom to top. In this embodiment, the second thermoplastic intermediate layer accordingly has a wedge-shaped cross-section. The direction indication "from bottom to top" denotes the direction from the lower edge to the upper edge, i.e., the vertical curve. However, more complex thickness profiles can also exist in which the wedge angle is variable from bottom to top (i.e., the vertical curve is location-dependent), linear, or non-linear.

Preferably, the thickness of the second thermoplastic intermediate layer increases at least sectionally from the bottom upward in the vertical course.

The variable thickness of the second thermoplastic intermediate layer can be limited to a section of the vertical course. This section preferably corresponds to at least the so-called HUD region of the laminated pane, that is to say the region in which an image is generated in a projection arrangement of the HUD projector. However, the section can also be larger. The thickness of the second thermoplastic intermediate layer can be variable throughout the vertical course, for example increasing substantially steadily from the lower edge to the upper edge.

The functional film can be a carrier film with a reflective coating or a metal-free reflective polymer film. The reflective coating is preferably applied to the interior-side surface, i.e., the surface that faces the vehicle interior, and preferably comprises at least one layer based on a metal or a purely dielectric layer sequence with alternating refractive indices. The layer on the basis of a metal preferably contains or consists of silver and/or aluminum. The dielectric layer sequence preferably contains silicon nitride, silicon oxide and/or zinc oxide. The reflective polymer film preferably comprises or consists of dielectric polymer layers. The dielectric polymer layers preferably contain PET. The functional film in this composition is suitable for reflecting p-polarized radiation striking the layer in the visible spectral range.

The functional film is preferably a polyethylene terephthalate (PET)-based film which is coated with a copolymer layer stack based on PET and/or polyethylene naphthalate (PEN). The coating is preferably applied to the interior-side surface, i.e., the surface that faces the vehicle interior. Suitable functional films are described, for example, in U.S. Pat. No. 5,882,774 A.

The functional film can be between 20 μm (micrometers) and 2 mm, preferably between 20 μm and 120 μm thick. The thickness of the functional film is substantially constant over the entire length; accordingly the functional film has a substantially rectangular cross-section. The functional film is therefore not a wedge film.

The first thermoplastic intermediate layer and the second thermoplastic intermediate layer can independently contain or consist of at least polyvinyl butyral (PVB), ethylene vinyl acetate (EVA), polyurethane (PU) or mixtures or copolymers or derivatives thereof, preferably polyvinyl butyral (PVB).

The first thermoplastic intermediate layer and the second thermoplastic intermediate layer can be formed independently of one another by a single film or else by more than one film.

The first thermoplastic intermediate layer and the second thermoplastic intermediate layer can be between 20 μm (micrometers) and 2 mm thick. The thickness of the first thermoplastic intermediate layer is substantially constant over the entire length; accordingly, the first thermoplastic intermediate layer has a substantially rectangular cross-section. The first thermoplastic intermediate layer is therefore not a wedge film. As described above, the thickness of the second thermoplastic intermediate layer is variable in the vertical course at least sectionally with a maximum wedge angle α of less than 0.20 mrad. The second thermoplastic intermediate layer is accordingly a wedge-shaped intermediate layer and can also be referred to as a wedge film.

The maximum wedge angles of less than 0.20 mrad according to the invention are significantly smaller than the wedge angles for conventional laminated panes within a range of 0.5 mrad. Films with only small wedge angles are more economical and easier to produce than films with larger wedge angles. Suitable methods for producing films with small wedge angles such as, for example, stretching methods or extrusion methods are known to a person skilled in the art.

The greater the image width of the HUD, i.e., the distance of the virtual image from the laminated glass, the smaller the wedge angle must be to avoid the double image. Large image widths occur in particular in so-called "augmented reality" HUDs in which not only information is projected onto a limited region of the windshield, but elements of the external environment are included in the representation. Examples thereof are the marking of a pedestrian, the display of the distance to a vehicle traveling ahead, or the projection of navigation information directly onto the road, for example to mark the lane to be selected.

In a particularly preferred embodiment, the second thermoplastic intermediate layer is a wedge-shaped stretched thermoplastic intermediate layer.

In a preferred embodiment, the second thermoplastic intermediate layer has a thickness of 200 μm to 1000 μm, preferably 300 μm to 850 μm, and the first thermoplastic intermediate layer has a thickness between 20 μm (micrometers) and 2 mm, preferably between 10 μm and 120 μm, particularly preferably between 15 μm and 90 μm, and very particularly preferably between 20 μm and 75 μm. In the second thermoplastic intermediate layer, the thickness information refers to the thickness at the thinnest point.

In an alternative preferred embodiment, the first thermoplastic intermediate layer has a thickness of 200 μm to 1000 μm, preferably 300 μm to 850 μm, and the second thermoplastic intermediate layer has a thickness between 20 μm (micrometers) and 2 mm, preferably between 10 μm and 120 μm, particularly preferably between 15 μm and 90 μm, and very particularly preferably between 20 μm and 75 μm. In the second thermoplastic intermediate layer, the thickness information refers to the thickness at the thinnest point.

The first thermoplastic intermediate layer and the functional film can also be present as a so-called bilayer and can be introduced as such into a stack sequence for producing a laminated pane according to the invention. That is to say, the first thermoplastic intermediate layer and the functional film do not necessarily have to be introduced sequentially into the stack sequence as two individual layers, but can be introduced into the stack sequence as a common bilayer.

Alternatively, the second thermoplastic intermediate layer and the functional film can also be present as a so-called bilayer and be introduced as such into a stack sequence to produce a laminated pane according to the invention. That is to say, the second thermoplastic intermediate layer and the functional film do not necessarily have to be introduced into the stack sequence sequentially as two individual layers, but can be introduced into the stack sequence as a common bilayer.

As described above, the second thermoplastic intermediate layer can also be formed by more than one film. In this case, one of the films can also be present together with the functional film as a so-called bilayer and be introduced as such into a stack sequence to produce a laminated pane according to the invention. In this embodiment, bilayers and the additional film or the additional films of the second thermoplastic intermediate layer are introduced sequentially into the stack sequence.

As described above, the functional film is arranged between the outer pane and the inner pane in the laminated pane according to the invention. The functional film is accordingly arranged inside the laminated pane and in this way, in particular in the HUD region, is protected for example from damage such as scratches and also against fingerprints.

The functional film preferably extends over the entire surface of the laminated pane, or substantially over the entire surface of the laminated pane. "Substantially over the entire surface of the laminated pane" means over the entire surface of the laminated pane minus a circumferential edge region of, for example, 20 mm.

Particularly preferably, the functional film extends over the entire surface of the laminated pane minus a circumferential edge region of, for example, 20 mm. If the laminated pane has a sensor window, the functional film preferably has a recess in the region of the sensor window.

As described above, the second thermoplastic intermediate layer can also be formed by more than one film. At least one of the films having the wedge angle must be formed therein.

The laminated pane according to the invention can additionally comprise a cover print, made in particular of a dark, and preferably black, enamel. The cover print is, in particular, a peripheral, i.e., frame-like, cover print which is accordingly arranged in a peripheral edge region, and/or a cover print which is arranged in a region surrounding the camera window. The peripheral cover print primarily serves as UV protection for the construction adhesive of the laminated pane. The cover print can be opaque and designed to cover the entire surface. The cover print can also be designed to be semi-transparent, at least sectionally, for example as a dot matrix, stripe matrix, or checkered matrix. Alternatively, the cover print can also have a gradient, for example from an opaque coverage to a semi-transparent coverage. The cover print is normally applied on the interior-side surface of the outer pane or on the interior-side surface of the inner pane.

In a preferred embodiment, the laminated pane has a sensor window, and the outer pane and/or the inner pane has a cover print in a circumferential edge region and in a region surrounding the sensor window.

The first thermoplastic intermediate layer and the second thermoplastic intermediate layer can, independently of one another, also be an intermediate layer with acoustically damping properties, an intermediate layer reflecting infrared radiation, an intermediate layer absorbing infrared radiation, an intermediate layer absorbing UV radiation, an at least sectionally colored layer, and/or an at least sectionally tinted intermediate layer. For example, the first thermoplastic intermediate layer or the second thermoplastic intermediate layer can also be a band filter film, for example.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate).

The thickness of the outer pane and of the inner pane can vary widely and accordingly be adapted to the requirements in the individual case. The outer pane and the inner pane preferably have thicknesses of 0.5 mm to 5 mm, particularly preferably of 1 mm to 3 m, very particularly preferably of 1.6 mm to 2.1 mm. Particularly preferably, the outer pane has a thickness of 2.1 mm, and the inner pane has a thickness of 1.2 mm or 1.6 mm. However, the outer pane or, in particular, the inner pane can also be thin glass with a thickness of 0.55 mm or 0.7 mm, for example.

The outer pane and the inner pane can be clear and colorless, but also tinted or colored, independently of one another. The total transmittance through the composite glass is greater than 70% in a preferred embodiment. The term total transmittance relates to the method defined by ECE-R 43, Annex 3, § 9.1 for testing the light transmittance of motor vehicle panes.

Independently of one another, the outer pane and the inner panes can be not prestressed, partially prestressed or prestressed. If at least one of the panes should be prestressed, this can be thermal or chemical prestressing.

The outer pane and/or the inner pane can have anti-reflection coatings, non-stick coatings, anti-scratch coatings, photocatalytic coatings, electrically heatable coatings, sun protection coatings and/or low-E coatings.

The height of the outer pane and the inner pane, i.e., in the case of a windshield, the distance between the roof edge of the laminated pane and the engine edge of the laminated pane is preferably between 0.8 m and 1.40 m, particularly preferably between 0.9 m and 1.25 m. It is therefore also understood that the height of the first thermoplastic intermediate layer, the second thermoplastic intermediate layer and the functional film is therefore preferably between 0.8 m and 1.40 m, particularly preferably between 0.9 m and 1.25 m.

The laminated pane according to the invention can be a vehicle pane. A vehicle pane is provided for separating a vehicle interior from an external environment. A vehicle pane is therefore a window pane which is inserted into a window opening of the vehicle body or is provided for this purpose. A laminated pane according to the invention is in particular a windshield of a motor vehicle.

In the case of a vehicle pane, "inner pane" refers to the pane that is provided to face the interior of the vehicle in the installed position. The outer pane refers to the pane which is provided to face the external environment of the vehicle in the installed position.

The laminated pane according to the invention is preferably curved in one or more spatial directions, as is usual for motor vehicle panes, wherein the typical radii of curvature are in a range of approximately 10 cm to approximately 40 m. However, the laminated pane can also be flat, for example if it is provided as a pane for buses, trains or tractors.

The invention also relates to a projection arrangement for a head-up display for displaying a virtual image for a viewer, at least comprising a laminated pane according to the invention and a projector which is directed toward a region B.

As usual with HUDs, the projector irradiates a region B of the windshield where the radiation is reflected towards the viewer (driver), thereby generating a virtual image that the viewer perceives from behind the windshield. The region B of the windshield that can be irradiated by the projector is also referred to as the HUD region. The beam direction of the projector can typically be varied by mirrors, in particular vertically, in order to adapt the projection to the body size of the viewer. The area in which the observer's eyes must be located at a given mirror position is referred to as the eye box window. This eye box window can be displaced vertically by adjusting the mirrors, wherein the entire area accessible as a result (i.e., the superimposition of all possible eye-box windows) is referred to as the eye box. An observer located within the eye box can perceive the virtual image. This means, of course, that the observer's eyes must be located within the eye box, not, for instance, the entire body.

The technical terms used here from the field of HUDs are generally known to the person skilled in the art. For a detailed depiction, reference is made to the dissertation "Simulation-based measurement technique for testing head-up displays" by Alexander Neumann at the Institute for Informatics of the Technical University of Munich (Munich: university library of TU Munich, 2012), in particular to Chapter 2 "The head-up display."

According to the invention, the radiation of the projector has a p-polarized share of at least 70%, and at least 5% of the p-polarized radiation emitted by the projector and striking the functional film of the laminated pane is reflected by the functional film in the direction of the viewer to produce a virtual image at a distance from the laminated pane, wherein the thickness of the second thermoplastic intermediate layer in the vertical course is variable at least in this region B with a maximum wedge angle $\alpha$ of less than 0.20 mrad.

The share of p-polarized radiation of the total radiation of the projector is preferably 80%, particularly preferably 100%.

The indication of the polarization direction refers to the plane of incidence of the radiation on the laminated pane. P-polarized radiation refers to a radiation the electric field of which oscillates in the plane of incidence. S-polarized radiation refers to a radiation the electric field of which oscillates perpendicular to the plane of incidence. The plane of incidence is spanned by the incident vector and the surface normal of the laminated pane in the geometric center of the irradiated region.

In a preferred embodiment of the projection arrangement according to the invention, the radiation of the projector strikes the laminated pane with an angle of incidence of 55° to 80°, preferably 55° to 75°, and particularly preferably 60° to 70°. This angle of incidence is relatively close to the Brewster angle for an air-glass transition (57.2°, soda-lime glass).

It is understood that the radiation of the projector is in the visible spectral range of the electromagnetic spectrum. Typical HUD projectors operate with the wavelengths of about 470 nm, 550 nm and 630 nm (RGB).

In a preferred embodiment of a projection arrangement according to the invention, 10% to 70%, preferably 15% to 60%, and particularly preferably 20% to 50% of the p-polarized radiation emitted by the projector and striking the functional film of the laminated pane is reflected from the functional film in the direction of the viewer.

In a preferred embodiment, the image width of the HUD in the projection arrangement according to the invention, i.e., the distance of the virtual image from the laminated pane, is at least 2,500 mm, preferably at least 3,500 mm, and very particularly preferably at least 4,500 mm. The image width can also be 10,000 mm or more. For example, the image width can be 2,500 mm, 3,000 mm, 4,500 mm or 10,000 mm.

Due to the wedge-shaped formation of the second thermoplastic intermediate layer, the two images, which are generated by reflection of the projector image on the interior-side surface of the interior-side pane of the inner pane and on the functional film, are superimposed with one another in the projection arrangement according to the invention. Distracting ghost images therefore do not occur, or only to a small extent.

The preferred embodiments of the laminated pane according to the invention described above also correspondingly apply to the projection arrangement according to the invention and vice versa.

The invention also relates to a method for producing a laminated pane according to the invention, wherein at least:

(a) an outer pane, a first thermoplastic intermediate layer, a functional film which is suitable for reflecting at least 5% of p-type polarized radiation striking the functional film, a second thermoplastic intermediate layer, the thickness of which in the vertical course is variable at least sectionally with a maximum wedge angle $\alpha$ of less than 0.20 mrad, and an inner pane are provided;

(b) a stack sequence is formed in which the functional film is arranged between the outer pane and the inner pane, the first thermoplastic intermediate layer is arranged between the outer pane and the functional film, and the second thermoplastic intermediate layer is arranged between the functional film and the inner pane, and (c) the stack sequence is connected by lamination.

If the laminated pane is to be curved, the outer pane and the inner pane are preferably subjected to a bending process before lamination. Preferably, the outer pane and the inner pane are curved together congruently (i.e., simultaneously and by the same tool) because this optimally matches the shape of the panes to one another for the subsequent lamination. Typical temperatures for glass-bending processes are, for example, 500° C. to 700° C.

The stack sequence can be laminated by means of conventional lamination methods. For example, so-called autoclave methods may be carried out at an elevated pressure of approximately 10 bar to 15 bar and at temperatures of 130° C. to 145° C. for approximately 2 hours. Alternatively, methods without autoclaving are also possible. Vacuum bag or vacuum ring methods known per se operate for example at about 200 mbar and 80° C. to 110° C.

Vacuum laminators can be used as an alternative. These consist of one or more heatable and evacuable chambers, in which the first pane and the second pane are laminated within, for example, approx. 60 minutes at reduced pressures of 0.01 mbar to 800 mbar and temperatures from 80° C. to 170° C.

The preferred embodiments of the laminated pane according to the invention described above also correspondingly apply to methods for producing a laminated pane according to the invention and vice versa.

The invention also relates to the use of a laminated pane according to the invention as a vehicle pane for a head-up display in means of locomotion for traffic on land, in the air or on water, in particular in motor vehicles and in particular in a windshield, very particularly for a head-up display in a motor vehicle.

In the following, the invention is explained in more detail with the aid of drawings and examples of embodiments. The drawings are schematic representations and are not true to scale. The drawings do not limit the invention in any way.

Figure 1:
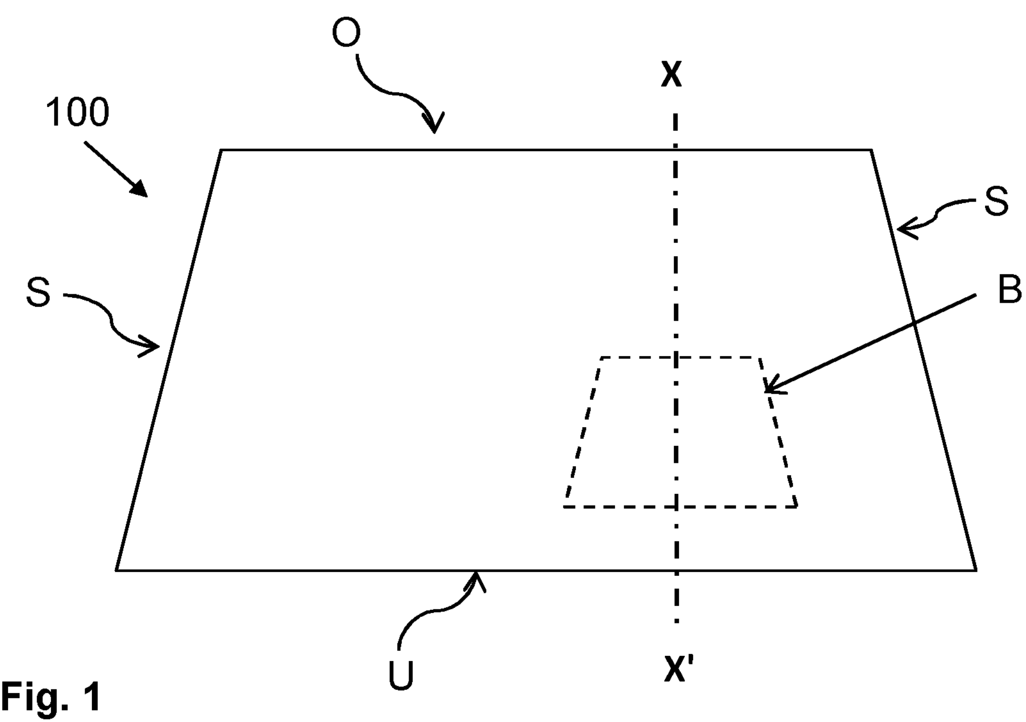
FIG. 1 shows a plan view of an embodiment of a laminated pane according to the invention.
Figure 2:
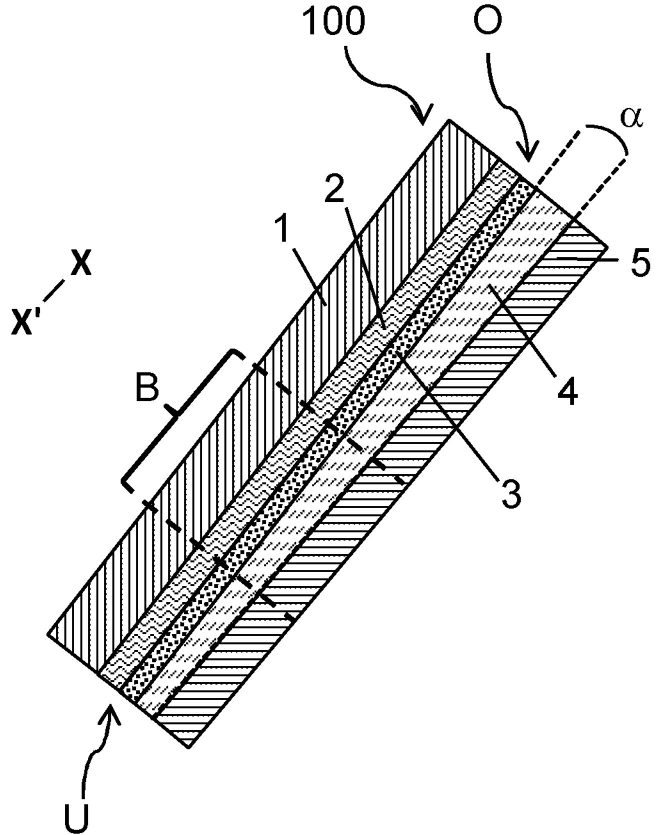
FIG. 2 shows a cross-section through the laminated pane according to FIG. 1 along the line of intersection X-X'.

FIG. 1 shows a plan view of an embodiment of a laminated pane 100 according to the invention, and FIG. 2 shows a cross-section through the laminated pane 100 according to FIG. 1 along the line of intersection X-X'. The laminated pane 100 is constructed from an outer pane 1, a first thermoplastic intermediate layer 2, a functional film 3, a second thermoplastic intermediate layer 4 and an inner pane 5. The functional film 3 is arranged between the outer pane 1 and the inner pane 5, the first thermoplastic intermediate layer 2 is arranged between the outer pane 1 and the functional film 3, and the second thermoplastic intermediate layer 4 is arranged between the functional film 3 and the inner pane 5. The outer pane 1 and the inner pane 5 are connected to one another via the first thermoplastic intermediate layer 2 and the second thermoplastic intermediate layer 4, between which the functional film 3 is arranged.

The laminated pane 100 shown in FIGS. 1 and 2 is, for example, a windshield of a passenger car. In the installed position, the outer pane 1 faces the external environment; the inner pane 5 faces the vehicle interior. The lower edge U of the laminated pane 100 is arranged downward in the direction of the engine of the passenger vehicle, the upper edge O of the laminated pane 100 is arranged upward in the direction of the roof, and the two side edges S are arranged laterally.

The outer pane 1 and the inner pane 5 consist, for example, of soda-lime glass. The outer pane 1 has, for example, a thickness of 2.1 mm; the inner pane 5 has, for example, a thickness of 1.6 mm or 1.2 mm.

The first thermoplastic intermediate layer 2 is, for example, an intermediate layer consisting of PVB and has a thickness of 75 μm. The thickness of the second thermoplastic intermediate layer 4 increases steadily in the vertical course from the lower edge U to the upper edge O. The increase in thickness is shown linearly in FIG. 2 for simplicity, but can also have more complex profiles. The second thermoplastic intermediate layer 4 is formed from a single film made of PVB. The wedge angle $\alpha$ is approximately 0.1 mrad, for example 0.14 mrad or 0.12 mrad, and the thickness of the film at the thinnest point is 0.76 mm.

FIG. 1 also shows a region B which corresponds to the HUD region of the laminated pane 100. In this region, images are to be generated by an HUD projector. Due to the wedge-shaped formation of the second thermoplastic intermediate layer 4, the two images which are generated by reflection of the projector image on the interior-side surface of the inner pane 5 and on the interior-side surface of the functional film 3 are superimposed on one another. Distracting ghost images therefore do not occur, or only to a small extent.

In the embodiment of the laminated pane 100 shown in FIGS. 1 and 2, the functional film 3 is, for example, a polyethylene terephthalate (PET)-based reflective film which is coated in the direction of the inner pane with a copolymer layer stack based on PET and polyethylene naphthalate (PEN) and is suitable for reflecting a share of 20% to 50% of p-type polarized radiation striking the functional film 3. The functional film 3 has, for example, a thickness between 20 μm and 120 μm.

The outer pane 1, the inner pane 5, the first thermoplastic intermediate layer 2 and the second thermoplastic intermediate layer 4 have the same outer dimensions so that the side edges, the upper edges and the lower edges of the outer pane 1, the inner pane 5, the first thermoplastic intermediate layer 2 and the second thermoplastic intermediate layer 4 are flush over one another when viewed through the laminated pane 100.

In the embodiment shown in FIGS. 1 and 2, the functional film 3 extends over the entire surface of the laminated pane 100. However, the functional film 3 preferably extends over the entire surface of the laminated pane 100 minus a circumferential edge region of 20 mm so that the functional film in the laminated pane is protected against external influences.

Figure 3:
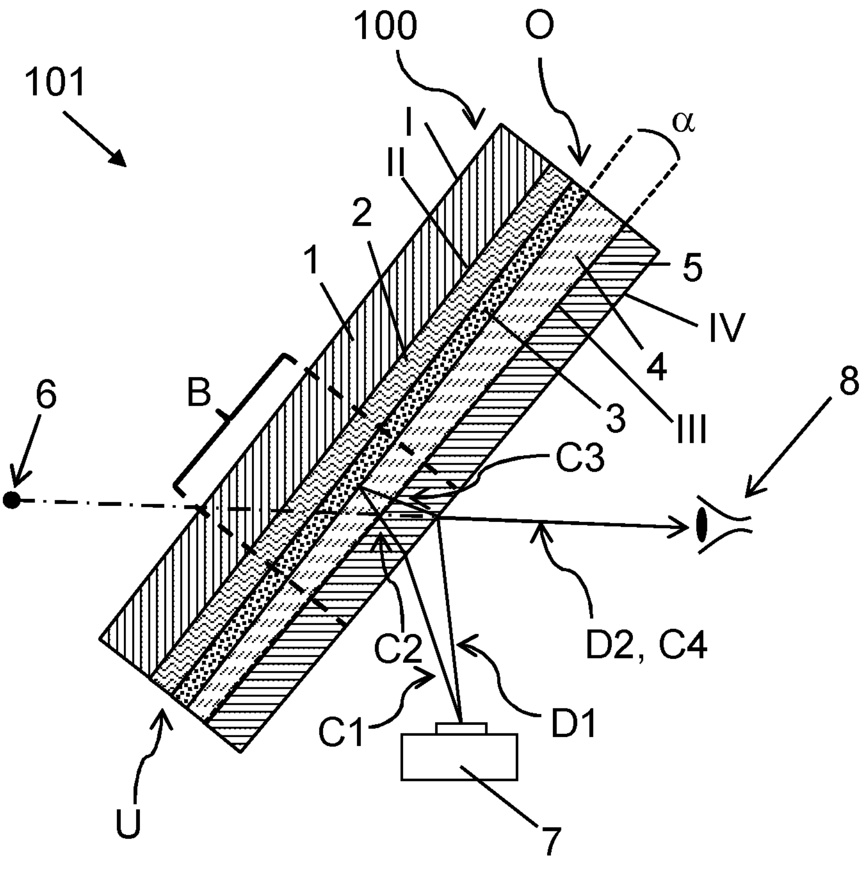
FIG. 3 shows a cross-section through an embodiment of a projection arrangement according to the invention.

FIG. 3 shows a cross-section of a projection arrangement 101 according to the invention, which comprises the laminated pane 100 from FIGS. 1 and 2. Apart from the laminated glass 100, the arrangement comprises a projector 7 which is directed toward a region B. In the region B (HUD range), images can be generated by the projector and are perceived by the viewer 8 (vehicle driver) as virtual images on the side of the laminated glass 100 facing away from him. The wedge angle in region B results in surfaces of the inner pane 5 and the functional film 3 that are inclined to each other which can prevent ghost images.

FIG. 3 also shows the beam path of two p-polarized light beams emitted by the projector 7. The light beam C strikes the interior-side surface IV of the inner pane 5 at the Brewster angle. The projection angle accordingly corresponds to the Brewster angle. There, this light beam enters the laminated pane 100 and is refracted and is subsequently reflected by the interior-side surface of the functional film 3 and exits from the laminated pane 100 at the interior-side surface IV of the inner pane 5 and is refracted again there and finally strikes the viewer 8.

The light beam D does not strike the interior-side surface IV of the inner pane 5 at the Brewster angle and is reflected there in the direction of the viewer 8.

C1 denotes the beam path of the light beam C between the projector 7 and the interior-side surface IV of the inner pane 5. C2 denotes the beam path of the light beam C between the interior-side surface IV of the inner pane 5 and the interior-side surface of the functional film 3. C3 denotes the beam path of the light beam C between the interior-side surface of the functional film 3 and the interior-side surface IV of the inner pane 5. C4 denotes the beam path of the light beam C between the interior-side surface IV of the inner pane 5 and the viewer 8.

D1 denotes the beam path of the light beam D between the projector 7 and the interior-side surface IV of the inner pane 5. D2 denotes the beam path of the light beam D between the interior-side surface IV of the inner pane 5 and the viewer 8.

The viewer 8 only perceives a virtual image 6 since the virtual images arising from the light beams C and D lie one above the other.

Figure 4:
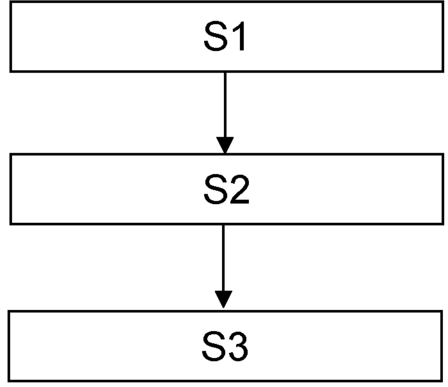
FIG. 4 shows a flowchart of an embodiment of the method according to the invention.

FIG. 4 shows a flowchart of an embodiment of the method according to the invention for producing a laminated pane 100 according to the invention.

The method comprises a first step S1 in which are provided an outer pane 1, a first thermoplastic intermediate layer 2, a functional film 3 which is suitable for reflecting at least 5% of p-polarized radiation striking the functional film 3, a second thermoplastic intermediate layer 4, the thickness of which in the vertical course is variable at least sectionally with a maximum wedge angle α of less than 0.20 mrad, and an inner pane 5.

In a second step S2, a stack sequence is formed in which the functional film 3 is arranged between the outer pane 1 and the inner pane 5, the first thermoplastic intermediate layer 2 is arranged between the outer pane 1 and the functional film 3, and the second thermoplastic intermediate layer 4 is arranged between the functional film 3 and the inner pane 5.

In a third step S3, the stack sequence is connected by lamination.

LIST OF REFERENCE SIGNS

1 Outer pane
2 First thermoplastic intermediate layer
3 Functional film
4 Second thermoplastic intermediate layer
5 Inner pane
6 Virtual image
7 Projector
8 Viewer
100 Laminated pane
101 Projection assembly
I Outer surface of the outer pane 1
II Interior-side surface of the outer pane 1
III Outer surface of the inner pane 5
IV Interior-side surface of the inner pane 5
O Upper edge
U Lower edge
S Side edge
B Region of the laminated pane/HUD region
C1 Beam path
C2 Beam path
C3 Beam path
C4 Beam path
D1 Beam path
D2 Beam path
α Wedge angle
X-X' Cutting line

The invention claimed is:

1. A laminated pane for a head-up display (HUD) comprising:
- an outer pane,
- a first thermoplastic intermediate layer,
- a functional film which is adapted to reflect at least 5% of p-type polarized radiation striking the functional film,
- a second thermoplastic intermediate layer having a thickness which is variable in a vertical course at least sectionally, and
- an inner pane,
- wherein the functional film is arranged between the outer pane and the inner pane,
- the first thermoplastic intermediate layer is arranged between the outer pane and the functional film,
- the second thermoplastic intermediate layer is arranged between the functional film and the inner pane, and the second thermoplastic intermediate layer has a maximum wedge angle of less than 0.20 mrad.

2. The laminated pane according to claim 1, wherein the maximum wedge angle is between 0.01 mrad and 0.19 mrad.

3. The laminated pane according to claim 2, wherein the maximum wedge angle is between 0.12 mrad and 0.15 mrad.

4. The laminated pane according to claim 1, wherein the functional film is adapted to reflect 10% to 70% of p-polarized radiation striking the functional film.

5. The laminated pane according to claim 4, wherein the functional film is adapted to reflect 15% to 60% of p-polarized radiation striking the functional film.

6. The laminated pane according to claim 1, wherein the functional film is a carrier film with a reflective coating or a metal-free reflective polymer film.

7. The laminated pane according to claim 6, wherein the functional film is a polyethylene terephthalate (PET)-based film which is coated with a copolymer layer stack based on PET and/or polyethylene naphthalate (PEN).

8. The laminated pane according to claim 1, wherein the first thermoplastic intermediate layer and the second thermoplastic intermediate layer independently of one another contain or consist of at least polyvinyl butyral (PVB), ethylene vinyl acetate (EVA), polyurethane (PU) or mixtures or copolymers or derivatives thereof.

9. The laminated pane according to claim 8, wherein the first thermoplastic intermediate layer and the second thermoplastic intermediate layer independently of one another contain or consist of at least polyvinyl butyral (PVB).

10. The laminated pane according to claim 1, wherein the second thermoplastic intermediate layer is a wedge-shaped stretched thermoplastic intermediate layer.

11. The laminated pane according to claim 1, wherein the second thermoplastic intermediate layer has a thickness of 200 μm to 1000 μm and the first thermoplastic intermediate layer has a thickness of between 10 μm and 120 μm.

12. The laminated pane according to claim 11, wherein the second thermoplastic intermediate layer has a thickness of 300 μm to 850 μm and the first thermoplastic intermediate layer has a thickness of between 15 μm and 90 μm.

13. The laminated pane according to claim 1, wherein the outer pane has a thickness of 2.1 mm, and the inner pane has a thickness of 1.2 mm or 1.6 mm.

14. A projection arrangement for a head-up display (HUD) for displaying a virtual image for a viewer, comprising:

a laminated pane according to claim 1, with an HUD region, and a projector which is directed toward the HUD region, wherein a radiation of the projector has a p-polarized portion of at least 70%, and at least 5% of the p-polarized radiation emitted by the projector and striking the functional film of the laminated pane is reflected from the functional film in a direction of the viewer to produce a virtual image at a distance from the laminated pane, and wherein a thickness of the second thermoplastic intermediate layer in a vertical course is variable at least in the region with a maximum wedge angle of less than 0.20 mrad.

15. The projection arrangement according to claim 14, wherein a share of p-polarized radiation of the total radiation of the projector is 80%.

16. The projection arrangement according to claim 14, wherein the radiation of the projector strikes the laminated pane with an angle of incidence of 55° to 80°.

17. The projection arrangement according to claim 14, wherein 10% to 70% of the p-polarized radiation emitted by the projector and striking the functional film of the laminated pane is reflected by the functional film in the direction of the viewer.

18. The projection arrangement according to claim 14, wherein the distance of the virtual image from the laminated pane is at least 2,500 mm.

19. A method for producing a laminated pane according to claim 1, comprising:

(a) providing an outer pane, a first thermoplastic intermediate layer, a functional film which is adapted to reflect at least 5% of p-type polarized radiation striking the functional film, a second thermoplastic intermediate layer having a thickness in a vertical course is variable at least sectionally with a maximum wedge angle of less than 0.20 mrad, and an inner pane;

(b) forming a stack sequence in which the functional film is arranged between the outer pane and the inner pane, the first thermoplastic intermediate layer is arranged between the outer pane and the functional film, and the second thermoplastic intermediate layer is arranged between the functional film and the inner pane, and (c) connecting the stack sequence by lamination.

20. A method comprising providing a laminated pane according to claim 1 as a vehicle pane in a vehicle of locomotion for traffic on land, in the air or on water.

21. The laminated pane according to claim 1, wherein the first thermoplastic intermediate layer has a substantially constant thickness and is not a wedge film.

* * * * *